Jan. 22, 1929.
H. GROB
1,700,041
MEANS FOR COMPENSATING THE FORCES IN VOLTAGE REGULATORS
Original Filed May 27, 1926
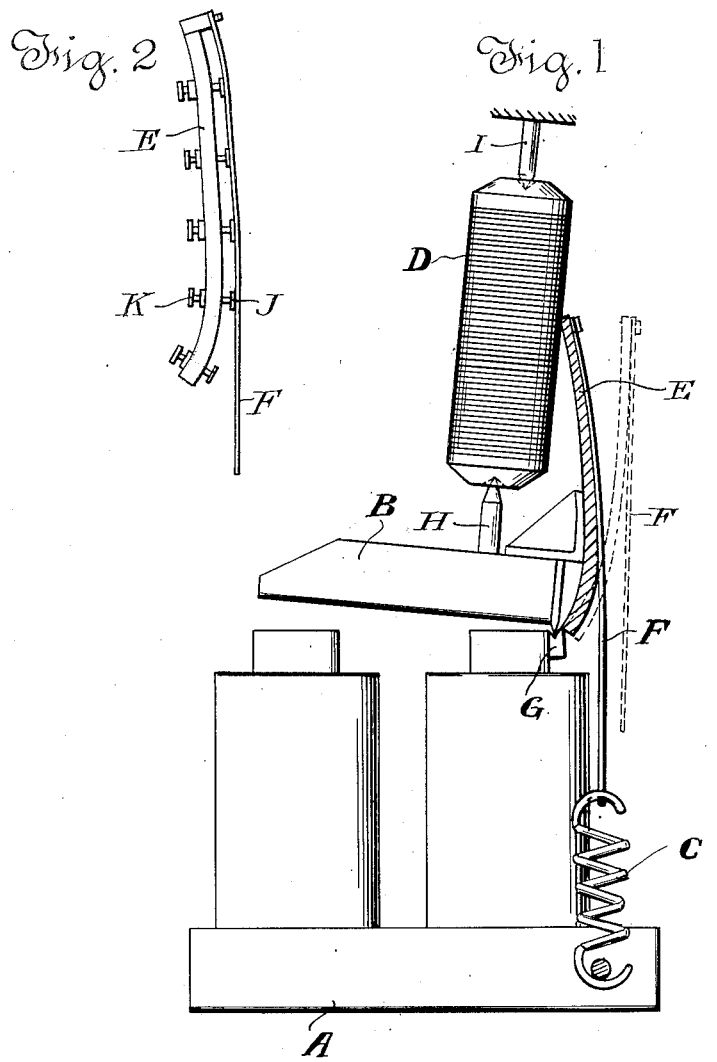
Inventor
Hugo Grob
By Spear, Middleton, Donaldson, Hall
Attorney Patented Jan. 22, 1929.

1,700,041

UNITED STATES PATENT OFFICE.

HUGO GROB, OF BERLIN, GERMANY.

MEANS FOR COMPENSATING THE FORCES IN VOLTAGE REGULATORS.

Application filed May 27, 1926, Serial No. 112,102, and in Germany May 27, 1925. Renewed September, 25, 1928.

This invention relates to electrical regulating apparatus, and more particularly to such apparatus wherein are employed pressure responsive variable resistance elements.

One of the objects of the invention is to provide an apparatus of the above nature capable of operating with a high degree of accuracy. Another object is to provide regulating apparatus of the above nature wherein the changes which take place in the electrical function being regulated, in order to operate the apparatus, are reduced to a minimum. Another object is to provide an apparatus of the above nature which is thoroughly practical and dependable and simple in construction. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which are shown one or more of the various possible embodiments of the several features of this invention, Figure 1 shows, somewhat diagrammatically, a regulating apparatus, and Figure 2 shows a modified construction of a portion of the apparatus.

Similar reference characters refer to similar parts in both views of the drawing.

As conducive to a clearer understanding of the features of this invention, it may be here noted that many electric regulators, adapted to maintain substantially constant a function of the output of a source of current such as a generator or storage battery, operate by interposing more or less resistance in a certain circuit, and that in many such regulators the variation in resistance is produced by means of a column of carbon disks, or a carbon pile, which is subjected to varying pressure. The resistance of a carbon pile decreases as the pressure thereon is increased and increases as the pressure is relieved. In voltage regulators for regulating the voltage of a variably driven generator, for example, the carbon pile is ordinarily arranged to be compressed by means of a spring, and an electromagnet energized by the voltage to be regulated acts against the force of the spring tending to relieve the pressure upon the carbon pile. Ordinarily the electromagnet in any regulator employing a pressure responsive resistance device such as a carbon pile, is required to exert a force varying between relatively wide limits as compared to the force required to be exerted by an electromagnet in a regulating apparatus which operates by opening and closing contacts to insert more or less resistance.

In regulating apparatus such as above briefly described, it is highly desirable that the forces be kept continually balanced throughout the range of action of the regulator; the forces to be dealt with are the force of the spring, the pull of the electromagnet, and the reactive force, or resistance to compression, of the carbon pile. Accuracy of regulation can be achieved only if these three forces remain always substantially balanced while the regulator is in operation. Then a very small change in the excitation of the electromagnet, and a very small change in the function being regulated, is sufficient to cause the required change in the compression of the carbon pile; a very small deviation in the function being regulated, from the normal value which it is desired to maintain constantly, is then sufficient to effect the required variation in resistance of the carbon pile throughout the entire scope of regulation.

The reactive force of the carbon pile increases as the compression of the carbon pile increases. The increase in the reactive force of the carbon pile during increase of compression is not uniform but varying, the reactive force first increasing gradually as the compression proceeds and thereafter increasing more rapidly as the compression advances and approaches maximum. This characteristic of the carbon pile is fixed and cannot be changed. Therefore, in order to maintain the desired balance or equilibrium of the forces in the regulator, either the force exerted by the electromagnet or the force exerted by the spring, or both, must change and adapt themselves to the changing reactive force of the carbon pile. The relation between the electromagnet and the position of the armature actuated thereby is adjustable only to a limited extent. To obtain the desired equilibrium or balance throughout the range of action of the regulator, it is necessary to employ at some point in the regulating mechanism a device by means of which one of the three forces is caused to balance the other two in each and any position of the regulator.

It has been attempted to obtain the desired equilibrium by the use of a roller operated upon by a cam moving transversely to the direction in which the carbon pile is compressed, the pressure exerted upon the carbon pile thereby varying in accordance with the curve of the cam. Such a curved guide or cam is extremely difficult to manufacture accurately. Not only are the individual points on the curve of the greatest importance, but also the direction of the tangent to the curve at any point engaged by the roller is of the greatest importance, a breaking up of the force into different components resulting from different directions of this tangent.

The present invention has for one of its dominant objects the provision of a thoroughly practical regulating apparatus embodying a force-compensating means whereby the three forces discussed above are dependably balanced throughout the entire range of movement of the regulator, and which is convenient to build with accuracy.

Referring now to the drawing in detail, there is diagrammatically shown in Figure 1 an electrical regulating apparatus adapted to control and maintain substantially constant a function of the output from a source of current which may be, for example, a generator or a storage battery. The function to be regulated may be either voltage or current. For clearness of description it will be assumed that the source of current, the output of which is to be regulated herein, is a shunt-wound variable speed generator such, for example, as employed in car lighting, and that the regulator is a voltage regulator for maintaining the generator voltage substantially constant.

In the drawing there is shown an electromagnet A having a pair of coils which, in the illustrative embodiment assumed, are voltage coils and which, as will be understood, are connected across the terminals of the generator and hence excited by the generator voltage. In series with the shunt field winding of the generator is placed a pressure responsive variable resistance element in the form of a carbon pile D, the resistance of which varies inversely with the pressure thereon and which has the peculiar characteristics hereinbefore pointed out. The voltage of the generator is controlled by controlling the field excitation thereof and in this instance by controlling the current flow through the carbon pile D, increasing the compression of the carbon pile to increase the current flow, and relieving the compression to decrease the current flow.

The armature for the electromagnet is shown herein in the form of a lever B which is pivoted upon a knife edge at G. The armature is provided with a projection H bearing against one end of the carbon pile D, the other end of the pile being suitably supported by a part I. A spring C acts upon the armature B tending to turn it about its pivot G in a direction to compress the carbon pile, and the magnetic field of the electromagnet A tends to turn the armature in the opposite direction and in a direction to relieve the compression. The projection H which bears against the carbon pile is positioned upon the armature at a point relatively close to the pivot G and thus a relatively large movement of the armature about its pivot, in response to variations in the pull of the magnet, effects a relatively small movement of the part H to compress or relieve the carbon pile.

In the operation of the regulating apparatus, when the generator voltage tends to increase, the strength of the magnetic field of the magnet A increases, resulting in a swinging of the armature in a direction to decrease the compression of the carbon pile, therefore increasing its resistance and weakening the generator field, tending to again lower the generator voltage. A decrease in generator voltage and hence in the field strength of the magnet A decreases the resistance of the carbon pile and strengthens the generator field, tending to raise the generator voltage. In this manner the regulating apparatus tends to keep the generator voltage, or other function being regulated, always substantially constant. However, it will be noted that, in order to actuate the regulating mechanism, and accomplish the changes just pointed out, some change is required to take place in the generator voltage, some movement of the armature being required each time the generator voltage starts to change. By keeping continually balanced the three forces hereinbefore pointed out, namely, the pull of the electromagnet, the pull of the spring, and the reactive force of the carbon pile, the resistance to movement of the armature is reduced to a minimum and the change in voltage or other function being regulated, in order to actuate the regulator, is accordingly reduced to a minimum.

Referring again to the drawing, there is provided an arm E which is connected to turn or swing with the armature B and projects outwardly in a direction transversely of the axis about which the armature swings. The spring C, which acts upon the armature as pointed out above, is connected to this arm E adjacent the outer end thereof and by means of a flexible cable F. The cable F extends in a direction substantially lengthwise of the arm E and the arm is provided with an outwardly curving surface against which the cable or flexible tension member F is adapted to bear during the operation of the regulator. The curved surface of the arm E constitutes, in effect, a plurality of points which are spaced at varying distances from the axis G of the armature. The spring F thus acts continually through an arm of force tending to swing the armature B in a direction to increase the compression of the carbon pile. As the armature swings, the arm of force changes in length. The curved surface of the arm E is so shaped that the arm of force, through which the spring C acts, increases in such manner that the force exerted by the spring and tending to compress the carbon pile changes in proportion to the changes in the reactive force of the carbon pile. The parts are so proportioned and the curve so chosen that, throughout the range of action of the regulator, the force exerted by the spring continually counterbalances the pull of the magnet plus the reactive force of the carbon pile. Substantial equilibrium or balance of the parts prevails in each position of the armature throughout its entire range of movement. It will be seen that, in this construction, there is but one variable quantity which is adjusted to accommodate the different positions of the armature and maintain the desired equilibrium, the quantity adjusted being the arm of force through which the spring acts tending to turn the armature, or the distance between the pivot G and the point of engagement between the cable F and the arm E.

The provision of the outwardly extending arm E, having the cable F attached to the outer end thereof and pulling in the direction shown, makes possible a substantial change in the lever arm through which the spring acts for a relatively small swinging movement of the armature B. In the drawing, the parts are represented in a position in which the compression of the carbon pile D is small. As the armature swings in a direction to increase the compression of the carbon pile, due to a tendency for the generator voltage to decrease, the point at which the cable F engages the curved surface of the arm E moves upwardly along the arm, gradually increasing in a predetermined manner the arm of force through which the spring acts on the armature. When the compression of the carbon pile approaches a maximum, the arm E has reached a position approximating that shown in dotted lines in Figure 1. Thereafter, upon further increase in the compression of the carbon pile, and as the reactive force of the carbon pile builds up rapidly, the arm of force increases more rapidly. During the early stages of compression of the carbon pile, and while the cable is bearing against the curved surface of the arm E, the arm of force changes much less rapidly than it does when the parts have reached a position such as that shown in the dotted lines and when the compression of the carbon pile is approaching maximum. Thus, it is possible to so position the arm E and to so shape the curvature of its surfaces against which the cable F bears, that the reactive force of the carbon pile, with its peculiar rate of increase with increase of compression, is continually counterbalanced.

In the embodiment shown in the drawing, it will be seen that the compensating means for balancing the reactive force of the carbon pile, and thus maintaining equilibrium, is inserted between the force of the spring and the resultant of the reactive force and the force of the magnet. It is to be understood, however, that this construction may be varied.

In Figure 2 of the drawings, there is shown a modified construction wherein the curved surface of the arm E, against which the cable F bears, is made up of a plurality of spaced points consisting of members J, which are adjustable in position toward and away from the axis of the armature by means of adjusting screws or bolts K. By means of a construction such as that shown in Figure 2, the shape of the curve, or the length of the lever arm through which the spring acts at different positions of the armature, may be adjusted.

Certain features of the arrangement herein disclosed I have claimed broadly in my copending application Serial No. 60,157, filed October 3, 1925.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In electrical regulating apparatus, in combination, a presure controlled variable resistance device whose resistance to compression increases with increased pressure thereon, a coil, spring means, means through which said coil and said spring means act upon said resistance device, the one tending to increase the compression thereof and the other acting in opposition to said increase, and means for substantially counteracting the reactive force of said resistance device against said last means including a swinging member and means acting against said swinging member at points thereon spaced progressively at greater distances from the axis of said member as the compression of said resisting device increases.

2. In electrical regulating apparatus, in combination, a pressure controlled variable resistance device whose resistance to compression increases with increased pressure thereon, a coil, spring means, means through which said coil and said spring means act upon said resistance device, the one tending to increase the compression thereof and the other acting in opposition to said increase, and means for substantially counteracting the reactive force of said resistance device against said last means including a swinging arm and a tension member tending to swing said arm and acting against the same at a plurality of points thereon spaced at different distances from the axis of the arm as the compression of said resistance device changes.

3. In electrical regulating apparatus, in combination, a pressure controlled variable resistance device whose resistance to compression increases with increased pressure thereon, a coil, spring means, means through which said coil and said spring means act upon said resistance device, the one tending to increase the compression thereof and the other acting in opposition to said increase, and means for substantially counteracting the reactive force of said resistance device against said last means including a flexible tension member, and a swinging arm having thereon a plurality of points spaced outwardly at different distances from the axis of said arm in a direction transverse to the direction of pull of said tension member, said tension member being arranged to act upon said arm at said different points as the compression of said resistance device changes.

4. In electrical regulating apparatus, in combination, a pressure controlled variable resistance device whose resistance to compression increases with increased pressure thereon, a coil, spring means, means through which said coil and said spring means act upon said resistance device, the one tending to increase the compression thereof and the other acting in opposition to said increase, and means for substantially counteracting the reactive force of said resistance device against said last means including a swinging arm having a curved surface and a flexible tension member connected to said arm and tending to swing the same and arranged to act against different portions of said curved surface as the compression of said resistance device changes.

5. In electrical regulating apparatus, in combination, a pressure controlled variable resistance device whose resistance to compression increases with increased pressure thereon, a coil, spring means, means through which said coil and said spring means act upon said resistance device, the one tending to increase the compression thereof and the other acting in opposition to said increase, and means for substantially counteracting the reactive force of said resistance device against said last means including a flexible tension member and a swinging arm, said arm having a curved surface facing transversely of the axis of the arm and said flexible tension member being connected to said arm at a point remote from said axis and bearing against said curved surface thereof.

6. In electrical regulating apparatus, in combination, a pressure controlled variable resistance device whose resistance to compression increases with increased pressure thereon, a coil, spring means, means through which said coil and said spring means act upon said resistance device, the one tending to increase the compression thereof and the other acting in opposition to said increase, and means for substantially counteracting the reactive force of said resistance device against said last means including a swinging arm having thereon a plurality of parts spaced outwardly at different distances from the axis of said arm, spring-urged means arranged to bear against said arm at said different parts as the compression of said resistance device changes, and means for adjusting the position of said parts with respect to the axis of the arm.

7. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, an arm connected to swing with said armature and projecting outwardly in a direction transversely of the axis about which the armature swings, a flexible cable connected to said arm adjacent the outer end thereof and extending in a direction approximately lengthwise thereof, and a spring acting through said cable tending to swing said armature in a direction to increase the compression of said resistance element, said arm having a surface spaced inwardly from the point of connection between said cable and said arm which is engaged by said cable as said armature swings to decrease the compression of said resistance element.

8. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, an arm swinging with said armature and having a plurality of parts spaced at different distances from the axis about which said arm swings, and spring urged means tending to swing said armature in a direction to increase the compression of said resistance element, said spring urged means being arranged to act against said different parts of said arm as said armature swings thereby to vary in predetermined manner the lever arm through which said spring urged means acts upon said armature.

9. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, an arm swinging with said armature and having a curved surface, and a flexible tension member acting upon said arm tending to swing said armature to increase the compression of said resistance element and bearing against said curved surface as said armature swings.

10. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, an arm swinging with said armature and having a curved surface, and a flexible tension member acting upon said arm tending to swing said armature to increase the compression of said resistance element and bearing against said curved surface as said armature swings, said curved surface being shaped so that the lever arm through which said tension member acts to swing said armature changes in a manner to change the compressing force exerted by said armature substantially in proportion to the changes in the reactive force of said resistance element.

11. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, an arm connected to swing with said armature and projecting outwardly in a direction transversely of the axis about which the armature swings, a flexible cable connected to said arm adjacent the outer end thereof and extending substantially lengthwise thereof, and a spring acting through said cable tending to swing said armature to increase the compression of said resistance element, said arm having a curved surface arching outwardly in a direction transversely of the armature axis and against which said cable bears.

12. In electrical regulating apparatus, in combination, a pressure controlled variable resistance device whose resistance to compression increases with increased pressure thereon, a coil, spring means, means through which said coil and said spring means act upon said resistance device, the one tending to increase the compression thereof and the other acting in opposition to said increase, and means for substantially counteracting the reactive force of said resistance device against said last means including a swinging member, spring means acting upon said swinging member, and means adapted to change the arm of force through which said spring acts to swing said member, said last means being adapted to increase said arm of force gradually as the compression of said resistance device starts and to increase said arm of force more rapidly as the compression of said resistance device approaches a maximum.

13. In electrical regulating apparatus, in combination, a pressure controlled variable resistance element, a coil, a swinging armature connected to vary the compression of said resistance element as it swings and positioned to be moved by the magnetic field of said coil in a direction to relieve said compression, spring means acting through an arm of force tending to swing said armature to increase the compression of said resistance element, and means through which said spring means acts adapted to increase the length of said arm of force gradually as said armature swings to increase the compression of said resistance element and adapted as said compression approaches a maximum to more rapidly increase the length of said arm of force.

In testimony whereof I have affixed my signature.

HUGO GROB.